United States Patent
Okawachi

(10) Patent No.: US 11,374,243 B2
(45) Date of Patent: Jun. 28, 2022

(54) FUEL CELL SYSTEM AND FUEL CELL VEHICLE

(71) Applicant: TOYOTA JIDOSHA KABUSHIKI KAISHA, Toyota (JP)

(72) Inventor: Eiji Okawachi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 313 days.

(21) Appl. No.: 16/546,461

(22) Filed: Aug. 21, 2019

(65) Prior Publication Data
US 2020/0091528 A1    Mar. 19, 2020

(30) Foreign Application Priority Data
Sep. 13, 2018   (JP) .............................. JP2018-171461

(51) Int. Cl.
*H01M 8/0438*    (2016.01)
*H01M 8/04955*   (2016.01)
*H01M 8/2457*    (2016.01)
*H01M 8/241*     (2016.01)
*H01M 8/247*     (2016.01)

(52) U.S. Cl.
CPC ... *H01M 8/04388* (2013.01); *H01M 8/04955* (2013.01); *H01M 8/241* (2013.01); *H01M 8/247* (2013.01); *H01M 8/2457* (2016.02); *H01M 2250/20* (2013.01)

(58) Field of Classification Search
CPC ........... H01M 8/0438; H01M 8/04388; H01M 8/04955; H01M 8/247; H01M 8/2457; H01M 8/241
See application file for complete search history.

(56) References Cited

U.S. PATENT DOCUMENTS

2016/0116450 A1    4/2016   Saito
2016/0315338 A1   10/2016   Nada et al.
2019/0074528 A1*   3/2019   Mori ................. H01M 8/04358

FOREIGN PATENT DOCUMENTS

JP    2014-126149 A    7/2014
JP    2014192048 A    10/2014
JP    2016-084844 A    5/2016
JP    2016-208726 A   12/2016

* cited by examiner

*Primary Examiner* — Karie O'Neill Apicella
(74) *Attorney, Agent, or Firm* — Dickinson Wright, PLLC

(57) ABSTRACT

In a fuel cell system, when filling hydrogen into a hydrogen tank is determined to be started, a transmitter configured to transmit a signal indicating pressure in the hydrogen tank to a hydrogen filling device transmits a first signal indicating that the pressure in the hydrogen tank is a first sensor value when the first sensor value detected by a first pressure sensor configured to detect pressure in a filling flow path connecting a filler port and the hydrogen tank is equal to or higher than a reference pressure predetermined to exceed the atmospheric pressure. Moreover, when the first sensor value is lower than the reference pressure, the transmitter transmits a second signal indicating that the pressure in the hydrogen tank is a second sensor value detected by a second pressure sensor configured to detect pressure in a supply flow path connecting the fuel cell and the hydrogen tank.

6 Claims, 7 Drawing Sheets

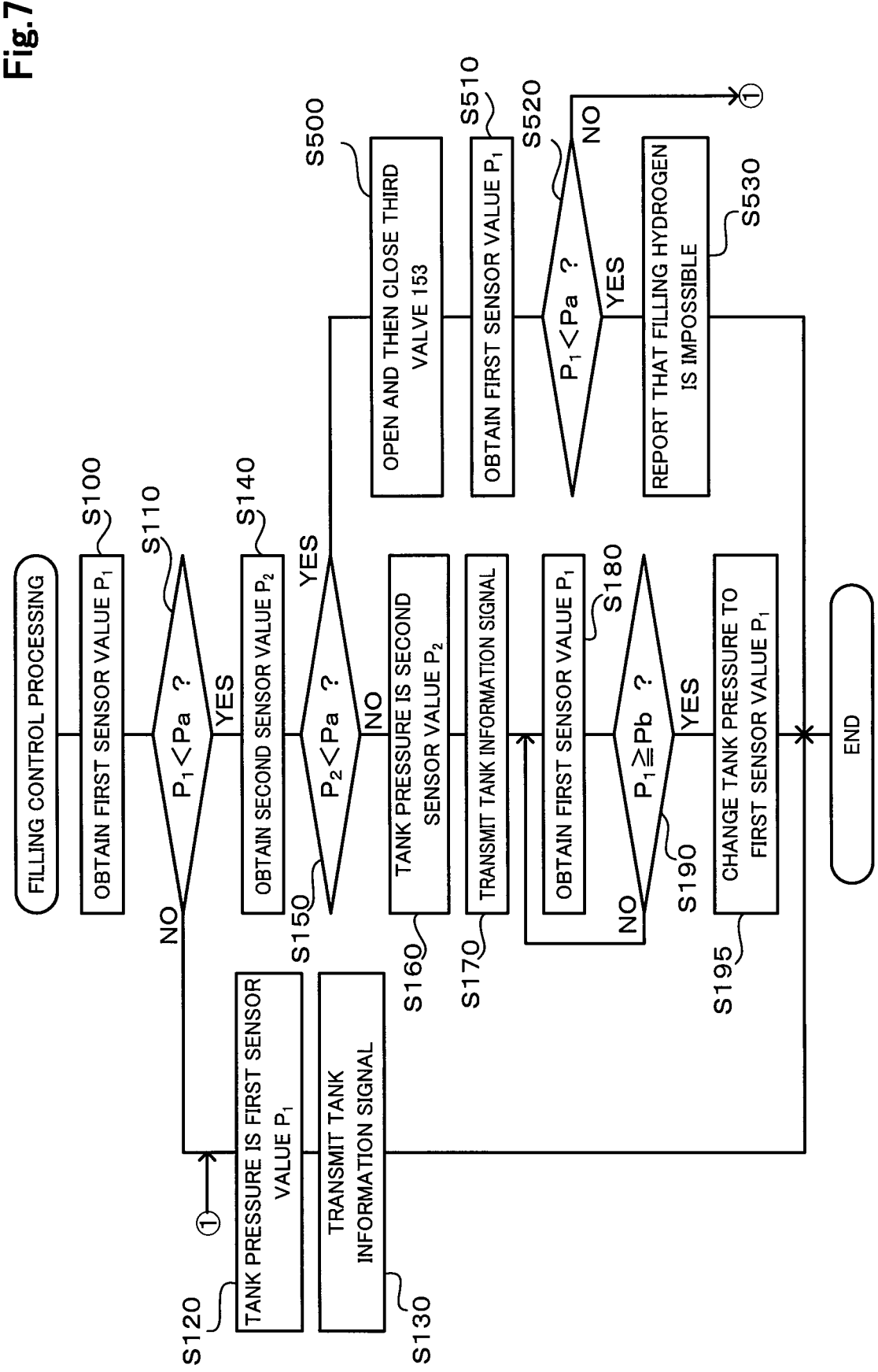

FUEL CELL SYSTEM AND FUEL CELL VEHICLE

CROSS REFERENCE TO RELATED APPLICATIONS

The present application claims priority to Japanese Patent Application No. 2018-171461, filed on Sep. 13, 2018, the contents of which are incorporated herein by reference in their entirety.

BACKGROUND

Field

The present disclosure relates to a fuel cell system and a fuel cell vehicle.

Related Art

A technique is known where a hydrogen station and a fuel cell vehicle communicate with each other when hydrogen is filled into a hydrogen tank of the fuel cell vehicle at the hydrogen station. Specifically, the vehicle transmits tank data including pressure and temperature of the tank to the hydrogen station. The hydrogen station assesses an initial state of the hydrogen tank in view of the received tank data and determines hydrogen filling conditions such as a flow rate of hydrogen based on the assessed initial state (see Patent Literature 1, for example).

Patent Literature 1: JP 2014-192048A

When pressure in the hydrogen tank of the fuel cell vehicle is detected, the pressure in the hydrogen tank is not directly detected, but pressure in piping connected to the hydrogen tank is usually detected. In such a configuration, if maintenance such as exchange of the piping connected to the hydrogen tank and exchange of parts disposed in the piping, or inspection or the like is performed, the piping is opened to the atmosphere, which lowers the pressure in the piping. If it is attempted to start filling hydrogen with the pressure in the piping lowered as described above, the hydrogen station that received tank data indicating unusual low pressure state may not start supplying hydrogen, so that filling hydrogen may fail.

SUMMARY

According to one aspect of the present disclosure, a fuel cell system is provided. The fuel cell system comprises a fuel cell, a hydrogen tank configured to store hydrogen, a filler port with which a hydrogen filling device configured to fill hydrogen into the hydrogen tank is engaged, a filling flow path connecting the filler port and the hydrogen tank, a supply flow path connecting the fuel cell and the hydrogen tank, a first pressure sensor disposed in the filling flow path and configured to detect pressure in the filling flow path, a first valve disposed in the filling flow path between the filler port and the first pressure sensor and configured to allow a hydrogen flow in a direction only from the filler port toward the hydrogen tank, a second valve disposed in the filling flow path between the first pressure sensor and the hydrogen tank and configured to allow the hydrogen flow in the direction only from the filler port toward the hydrogen tank when the hydrogen is filled into the hydrogen tank, a second pressure sensor disposed in the supply flow path and configured to detect pressure in the supply flow path, a sealing valve configured to seal a part of the supply flow path where the second pressure sensor is disposed in a non-generating state of the fuel cell, and a transmitter configured to transmit a signal indicating pressure in the hydrogen tank to the hydrogen filling device. Upon determination that filling hydrogen into the hydrogen tank is about to start, when a first sensor value detected by the first pressure sensor is equal to or higher than a reference pressure predetermined to be higher than the atmospheric pressure, the transmitter transmits a first signal indicating that the pressure in the hydrogen tank is the first sensor value, and when the first sensor value is lower than the reference pressure, the transmitter transmits a second signal indicating that the pressure in the hydrogen tank is a second sensor value detected by the second pressure sensor.

BRIEF DESCRIPTION OF THE DRAWINGS

FIG. 7 is a flowchart illustrating a routine of filling control processing.

DETAILED DESCRIPTION

Figure 1:
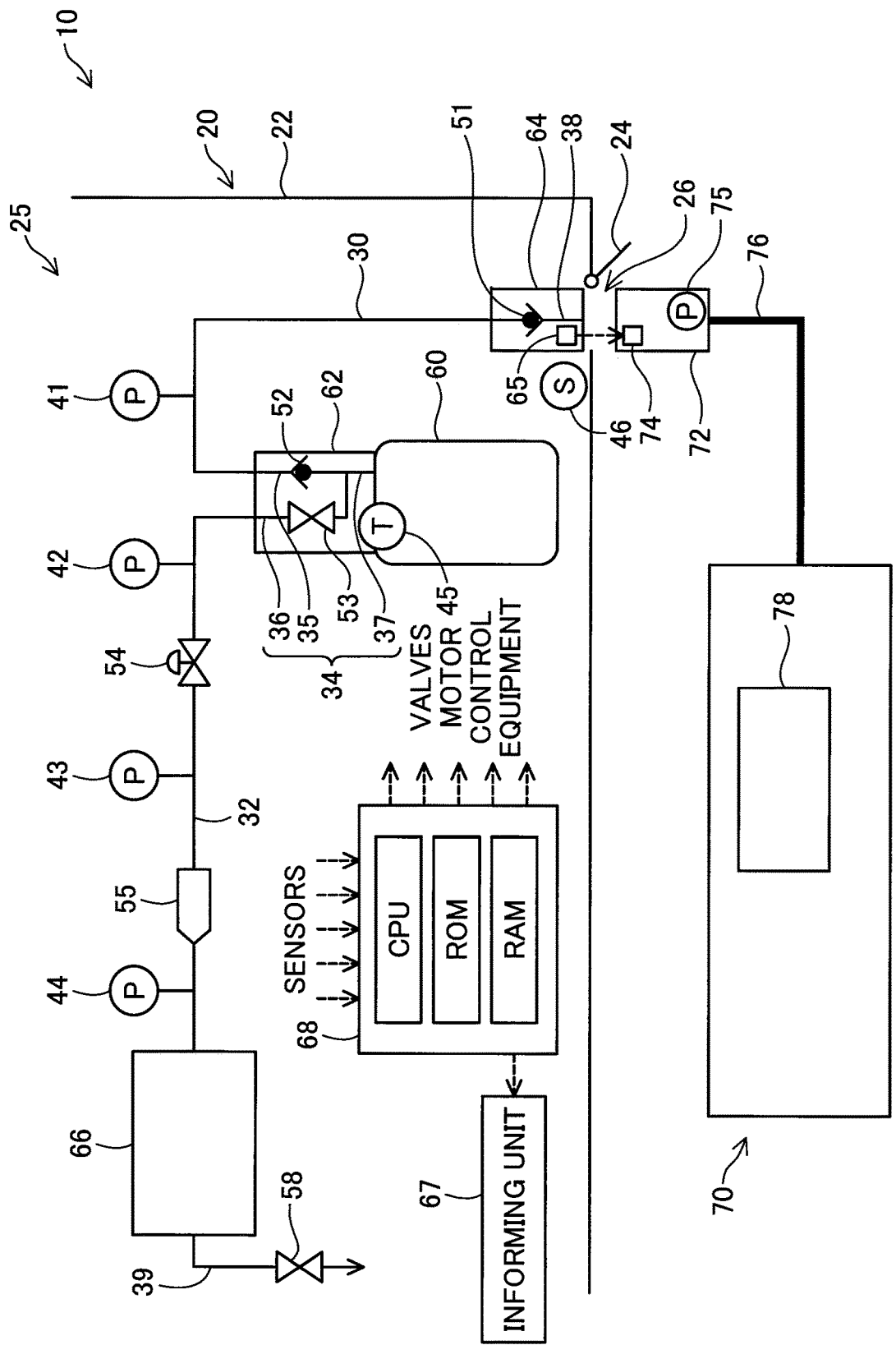
FIG. 1 is an explanatory diagram illustrating a schematic configuration of a fuel cell system.

A. First Embodiment (A-1) Overall Configuration:

FIG. 1 is an explanatory diagram illustrating a schematic configuration of a fuel cell system 25 according to a first embodiment of the present disclosure. The fuel cell system 25 is installed in a fuel cell vehicle 20, and the fuel cell vehicle 20 constitutes a hydrogen filling system 10 along with a hydrogen filling device 70.

The fuel cell system 25 is a device configured to generate electricity to be used by a drive motor, not shown, installed in the fuel cell vehicle 20. The fuel cell system 25 includes a fuel cell 66, a hydrogen tank 60, a receptacle 64, filling piping 30, supply piping 32, an informing unit 67, and a controller 68. The hydrogen tank 60 and the receptacle 64 are connected by the filling piping 30 while the hydrogen tank 60 and the fuel cell 66 are connected by the supply piping 32. FIG. 1 shows only a part involved in a hydrogen flow in a configuration of the fuel cell vehicle 20. The fuel cell vehicle 20 further includes a configuration to send oxidizing gas including oxygen to the fuel cell 66, a configuration to send coolant to the fuel cell 66, and a configuration for driving the drive motor; however, description thereof will be omitted.

The fuel cell 66 is a power generator to generate electricity by electrochemical reaction between fuel gas and oxidizing gas and has a stack structure in which a plurality of unit cells are stacked. The fuel cell 66 in the present embodiment is a solid polymer fuel cell; however, another kind of fuel cell may be used. Each of the plurality of unit cells included in the fuel cell 66 includes a flow path formed to send hydrogen as fuel gas on an anode side (hereinafter also referred to as an anode side flow path) and a flow path formed to send air as oxidizing gas on a cathode side (hereinafter also referred to as a cathode side flow path) with an electrolyte membrane disposed between these flow paths.

The hydrogen tank 60 is a device configured to store hydrogen to be supplied to the fuel cell 66. The hydrogen tank 60 may be a resin tank including a fiber reinforced plastic (FRP) layer in which a fiber impregnated with thermosetting resin is wound around an outer surface of a resin liner, for example. The hydrogen tank 60 includes a valve mechanism 62 disposed in a tank mouthpiece. The valve mechanism 62 includes an in-valve flow path 34 formed in it. The in-valve flow path 34 includes a first flow path 35, a second flow path 36 and a third flow path 37. One end of the first flow path 35 opens to a surface of the valve mechanism 62, and the filling piping 30 is connected to this end. In the first flow path 35, a second check valve 52 configured to allow a hydrogen flow only from a filling piping 30 toward the inside of the hydrogen tank 60 is disposed. The second check valve 52 is also referred to as a "second valve". The other end of the first flow path 35 is connected to an end of a third flow path 37. One end of the second flow path 36 opens to the surface of the valve mechanism 62, and the supply piping 32 is connected to this end. In the second flow path 36, a valve one 53 that is an electromagnetic valve configured to open and close the second flow path 36 is disposed. The valve one 53 is also referred to as a "third valve". The other end of the second flow path 36 is connected to an end of the third flow path 37. The other end of the third flow path 37 is open in the hydrogen tank 60. Note that the third flow path 37 where the first flow path 35 and the second flow path 36 join may be omitted, and the first flow path 35 and the second flow path 36 may separately communicate with space in the hydrogen tank 60. The hydrogen tank 60 further includes a temperature sensor 45 configured to detect temperature in the hydrogen tank 60.

The receptacle 64 is disposed in a side of a vehicle body 22 of the fuel cell vehicle 20 and is configured to engage the hydrogen filling device 70 with the fuel cell vehicle 20 when hydrogen is filled into the hydrogen tank 60. In the receptacle 64, a fourth flow path 38 is formed. An end of the fourth flow path 38 is connected to the filling piping 30. The other end of the fourth flow path 38 is open to the surface of the vehicle body 22 so as to form a filler port 26 into which hydrogen supplied from the hydrogen filling device 70 flows. In the fourth flow path 38, a first check valve 51 configured to allow a hydrogen flow only from the filler port 26 toward the filling piping 30 is disposed. The first check valve 51 is also referred to as a "first valve". The receptacle 64 further includes a transmitter 65. The transmitter 65 is a device configured to transmit a signal indicating pressure in the hydrogen tank 60 to the hydrogen filling device 70 by infrared communication. Hereinafter, the pressure in the hydrogen tank 60 is simply referred to as "tank pressure", information about the tank pressure is referred to as "tank information", and a signal to communicate the tank information is referred to as a "tank information signal". The transmitter 65 may be disposed apart from the receptacle 64 as long as communication with the hydrogen filling device 70 is possible. The transmitter 65 is driven by the controller 68 to transmit the tank information signal, as described later.

The vehicle body 22 includes a lid 24 to cover the receptacle 64. The lid 24 is attached to the vehicle body 22 via a hinge to be freely openable and closable and is opened when hydrogen is filled into the hydrogen tank 60 by the hydrogen filling device 70. A lid sensor 46 configured to detect an opening/closing state of the lid 24 is disposed adjacently to the receptacle 64.

In the configuration shown in FIG. 1, a flow path connecting the filler port 26 and the hydrogen tank 60, that is, a flow path through which hydrogen supplied from the filler port 26 flows to be filled into the hydrogen tank 60, is also referred to as a "filling flow path". According to the present embodiment, the "filling flow path" includes the filling piping 30, the first flow path 35, the third flow path 37, and the fourth flow path 38. In the filling flow path, a filling pressure sensor 41 configured to detect pressure in the filling flow path between the second check valve 52 and the first check valve 51 is disposed. In the present embodiment, the filling pressure sensor 41 is disposed in the filling piping 30. The filling pressure sensor 41 is also referred to as a "first pressure sensor".

When hydrogen is filled into the hydrogen tank 60, a nozzle 72, described later, of the hydrogen filling device 70 is engaged with the receptacle 64 so that hydrogen can be filled into the hydrogen tank 60 from the hydrogen filling device 70 via the nozzle 72, the receptacle 64, and the filling flow path. At this time, supplying high-pressure hydrogen from the hydrogen filling device 70 opens the first check valve 51 and the second check valve 52. While hydrogen is filled, the pressure detected by the filling pressure sensor 41 is approximately equal to the tank pressure. Thus, the detected value by the filling pressure sensor 41 may be used as the tank pressure.

As described above, when hydrogen is filled into the hydrogen tank 60 and when filling hydrogen is completed, the pressure in the filling piping 30 is approximately equal to the tank pressure. Subsequently, when the fuel cell 66 generates electricity consuming hydrogen in the hydrogen tank 60 and thus the tank pressure is lowered, the pressure on a side of the receptacle 64 of the second check valve 52 becomes higher than the pressure on a side of the hydrogen tank 60 of the second check valve 52. As a result, the second check valve 52 is opened by a pressure difference, so that even if the tank pressure is lowered, the tank pressure and pressure in the filling piping 30 on a downstream side of the first check valve 51 are kept approximately equal.

In the configuration shown in FIG. 1, a flow path connecting the fuel cell 66 and the hydrogen tank 60, that is, a flow path through which hydrogen discharged from the hydrogen tank 60 flows to be supplied to the fuel cell 66, is also referred to as a "supply flow path". According to the present embodiment, the "supply flow path" includes the supply piping 32, the second flow path 36, and the third flow path 37. In the supply piping 32, a pressure reducing valve 54 and an injector 55 are disposed in this order from an upstream side of the hydrogen flow. The injector 55 includes an electromagnetic valve, and opening and closing operation of this electromagnetic valve adjusts hydrogen amount supplied from the hydrogen tank 60. When the fuel cell 66 generates electricity, the valve one 53 is opened, so that high-pressure hydrogen flows into the supply piping 32 from the hydrogen tank 60. Then, the high-pressure hydrogen flowing into the supply piping 32 is decompressed by the pressure reducing valve 54 and supplied from the injector 55 to the anode side flow path in the fuel cell 66. The hydrogen amount supplied to the fuel cell 66 is adjusted by opening and closing control in the injector 55. In the supply flow path, a high pressure sensor 42 is disposed between the valve one 53 and the pressure reducing valve 54, a medium pressure sensor 43 is disposed between the pressure reducing valve 54 and the injector 55, and a low pressure sensor 44 is disposed between the injector 55 and the fuel cell 66.

When the fuel cell 66 generates electricity, detected values of the high pressure sensor 42, the medium pressure sensor 43, and the low pressure sensor 44 become smaller in this order. The detected values of the high pressure sensor 42, the medium pressure sensor 43, and the low pressure sensor 44 are used when the hydrogen amount supplied to the fuel cell 66 is controlled while the fuel cell 66 generates electricity and also when hydrogen is filled into the hydrogen tank 60, as described later. When hydrogen is filled into the hydrogen tank 60, the valve one 53 is closed. Therefore, the detected values of the high pressure sensor 42, the medium pressure sensor 43, and the low pressure sensor 44 do not vary according to filling operation. The high pressure sensor 42, the medium pressure sensor 43, and the low pressure sensor 44 are each also referred to as a "second pressure sensor".

The fuel cell 66 is also connected with a discharge piping 39 through which fuel gas flowing through the anode side flow path in the fuel cell 66 is discharged. In the discharge piping 39, a valve two 58 that is an electromagnetic valve configured to open and close the discharge piping 39 is disposed. A downstream side of the discharge piping 39 may be connected to the supply piping 32 between the injector 55 and the fuel cell 66 so that fuel gas discharged from the fuel cell 66 can be supplied to the fuel cell 66, so as to form a flow path circulating the fuel gas. When the fuel cell 66 stops generating electricity, the valve two 58 is closed.

In the present embodiment, part of the supply flow path where the high pressure sensor 42, the medium pressure sensor 43, and the low pressure sensor 44, which serve as the second pressure sensors, are disposed is sealed when the fuel cell 66 does not generate electricity. Specifically, the supply flow path on upstream sides of the second pressure sensors is sealed by the valve one 53 serving as the third valve as described above. The supply flow path on downstream sides of the high pressure sensor 42 and the medium pressure sensor 43 serving as the second pressure sensors is sealed by both the injector 55 and the valve two 58. The supply flow path on a downstream side of the low pressure sensor 44 serving as the second pressure sensor is sealed by the valve two 58. Each of the valves sealing the supply flow path on the downstream sides of the second pressure sensors is also referred to as a "fourth valve". Moreover, the valves configured to seal the part of the supply flow path where the second pressure sensors are disposed in the non-generating state of the fuel cell 66, that is, the "third valve" and the "fourth valve" are also referred to as a "sealing valve" altogether.

The informing unit 67 is a device configured to report information about whether filling hydrogen is possible, as described later. The informing unit 67 may be, for example, a display disposed in an instrument panel of the fuel cell vehicle 20. Alternatively, information reported by the informing unit 67 may be given by sound or voice instead of or in addition to being shown on a display or the like so as to be visible. The information reported by the informing unit 67 may be output in any way as long as a user of the fuel cell system 25 (a user of the fuel cell vehicle 20) can recognize contents of the information.

The controller 68 includes a so-called microcomputer equipped with a CPU (central processing unit) executing logical operation, ROM (read-only memory), RAM (random-access memory), and so forth. The controller 68 receives detected signals from the aforementioned sensors such as the pressure sensors including the filling pressure sensor 41, the high pressure sensor 42, the medium pressure sensor 43, and the low pressure sensor 44, the temperature sensor 45, and the lid sensor 46. In addition to these sensors, the controller 68 also receives detected signals from unillustrated various sensors such as an accelerator opening degree sensor, a shift position sensor, and a vehicle speed sensor. The controller 68 performs various control in relation to the fuel cell vehicle 20 based on the detected signals. Specifically, the controller 68 outputs driving signals to the respective valves, the transmitter 65, the informing unit 67, the drive motor, or various control equipment. The controller 68 further includes a timer so as to measure elapsed time after inputting various signals or executing various processing. The controller 68 does not have to perform all the control of filling operation of hydrogen and running operation of the vehicle by itself. Independent controllers, i.e., ECUs (Electronic Control Unit) may be configured to perform the respective control and exchange information with each other.

The hydrogen filling device 70 is a device configured to fill hydrogen into the hydrogen tank 60 of the fuel cell vehicle 20 and may be disposed at a hydrogen station, for example. The hydrogen filling device 70 includes a hydrogen storage unit (not shown) configured to store high-pressure hydrogen, a hydrogen supply hose 76 configured to lead high-pressure hydrogen taken out of the hydrogen storage unit, the nozzle 72 disposed at an end of the hydrogen supply hose 76, a receiver 74, a tank pressure sensor 75, and a controller 78. The nozzle 72 is configured to engage with the receptacle 64 of the fuel cell vehicle 20 so that a hydrogen flow path of the hydrogen filling device 70 that is open at the nozzle 72 can be connected to the filling flow path of the fuel cell vehicle 20 when hydrogen is filled. The receiver 74 performs infrared communication with the transmitter 65 of the fuel cell vehicle 20 so as to receive a tank information signal that is a signal indicating the tank pressure. The tank pressure sensor 75 is disposed in the nozzle 72 to detect pressure in the hydrogen flow path in the nozzle 72. In a case that the nozzle 72 is engaged with the receptacle 64 and the flow path in the nozzle 72 communicates with the inside of the hydrogen tank 60 when hydrogen is filled, the tank pressure can be detected by the tank pressure sensor 75. The controller 78 includes a so-called microcomputer equipped with a CPU executing logical operation, ROM, RAM, and so forth. Once the receiver 74 receives a tank information signal, the controller 78 starts control of filling hydrogen. When hydrogen is filled, the controller 78 adjusts a flow rate of hydrogen to be supplied to the fuel cell vehicle 20 based on the tank information indicated by the tank information signal. The hydrogen filling device 70 further includes a precooler configured to cool hydrogen prior to filling.

Figure 2:
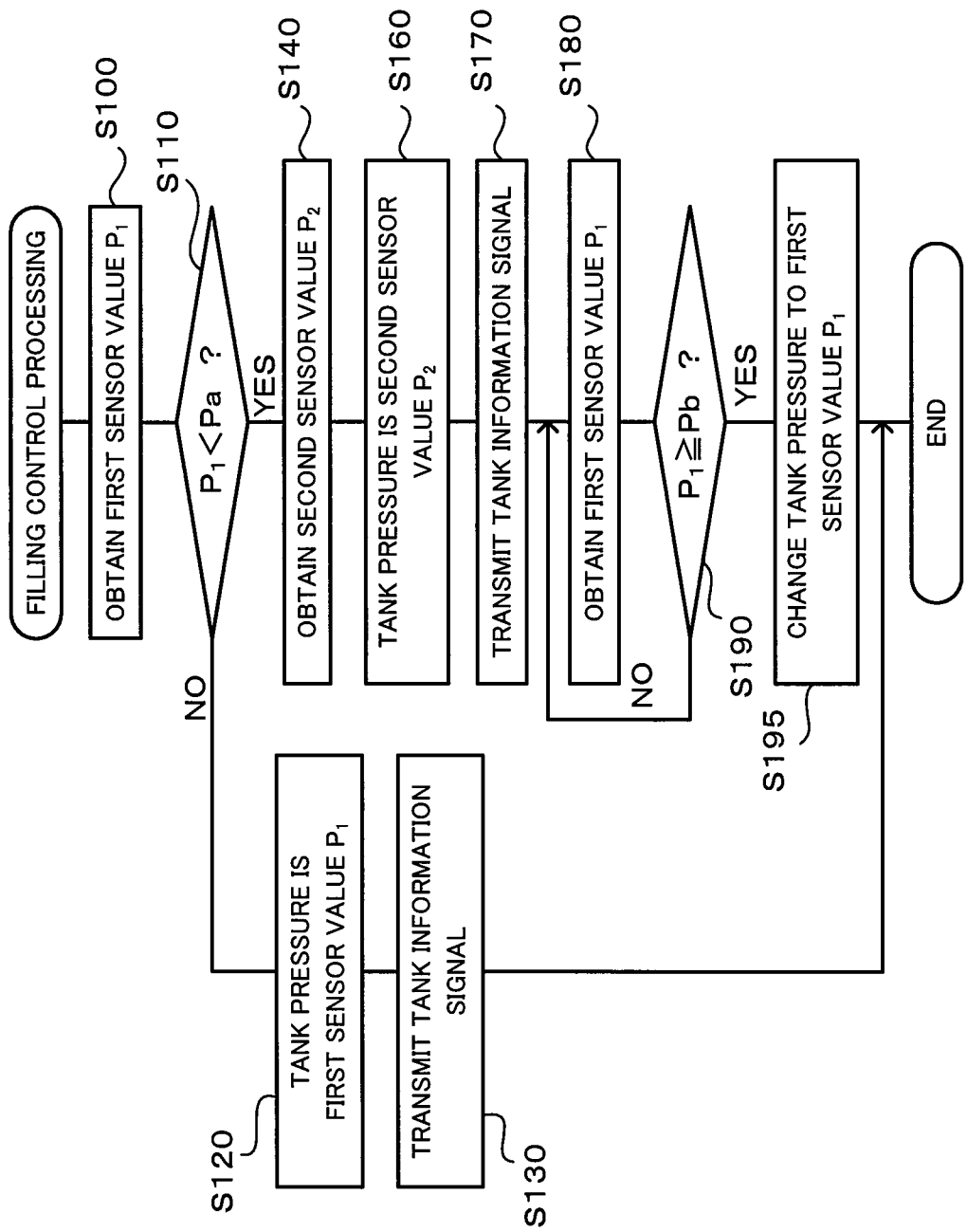
FIG. 2 is a flowchart illustrating a routine of filling control processing.

(A-2) Operation When Filling Starts:

FIG. 2 is a flowchart illustrating a filling control processing routine executed by the CPU of the controller 68 in the fuel cell vehicle 20 according to the present embodiment. This routine is executed when it is determined that filling hydrogen into the hydrogen tank 60 of the fuel cell vehicle 20 is about to start. In the present embodiment, the controller 68 determines that filling hydrogen into the hydrogen tank 60 is about to start when the controller 68 receives a signal indicating that the lid 24 is opened from the lid sensor 46. When the filling control processing routine shown in FIG. 2 is started after the lid 24 of the fuel cell vehicle 20 is opened, the nozzle 72 of the hydrogen filling device 70 is engaged with the receptacle 64 by an operator who performs filling hydrogen operation.

When the routine is started, the CPU of the controller 68 obtains a detected signal from the filling pressure sensor 41 (step S100). A value of pressure in the filling piping 30 detected by the filling pressure sensor 41 is also referred to as a "first sensor value $P_1$". Next, the CPU of the controller 68 compares the obtained first sensor value $P_1$ with a predetermined first reference pressure Pa (step S110). The first reference pressure Pa is predetermined to be higher than the atmospheric pressure. Specifically, the first reference pressure Pa can be set equal to or higher than the "lowest pressure during use" that is predetermined as the lowest pressure during use of the hydrogen tank 60, for example. In the present embodiment, when hydrogen in the hydrogen tank 60 is used, consumption state of hydrogen is controlled such that the tank pressure does not fall below the lowest pressure during use set slightly higher than the atmospheric pressure. In the present embodiment, the lowest pressure during use is set to 0.5 MPa, and the first reference pressure Pa is set to the same pressure as the lowest pressure during use, that is, 0.5 MPa.

When the first sensor value $P_1$ is equal to or higher than the first reference pressure Pa (step S110: NO), the CPU of the controller 68 generates tank information indicating that the tank pressure is the first sensor value $P_1$ (step S120). As aforementioned, when the first sensor value $P_1$ is equal to or higher than the first reference pressure Pa, it is generally considered that no malfunction causing pressure reduction occurs in the filling piping 30 that usually has the same pressure as that of the hydrogen tank 60. After the step S120, the controller 68 instructs the transmitter 65 to start transmitting a tank information signal indicating that the tank pressure is the first sensor value $P_1$ (step S130) and terminates the routine. The tank information signal indicating that the tank pressure is the first sensor value $P_1$ is also referred to as a "first signal".

Operation relating to filling hydrogen performed after the step S130 is described below. As aforementioned, in the step S130, when transmitting the tank information signal indicating that the tank pressure is the first sensor value $P_1$ is started, the hydrogen filling device 70 starts a series of operations relating to filling hydrogen. The hydrogen filling device 70 in the present embodiment performs pre-filling at first when starting filling operation. The pre-filling is operation in which the hydrogen filling device 70 supplies the hydrogen tank 60 with hydrogen at a predetermined flow rate for predetermined time so that the hydrogen filling device 70 can examine the hydrogen tank 60. The hydrogen amount to be supplied to the hydrogen tank 60 in the pre-filling is sufficiently lowered so as not to cause any inconvenience even if leakage exists in the hydrogen tank 60 or the like. The controller 78 of the hydrogen filling device 70 examines whether leakage or the like exists in a hydrogen flow path involved in filling hydrogen including the hydrogen tank 60 based on a degree of change in the tank pressure during the pre-filling. During the pre-filling, the controller 78 of the hydrogen filling device 70 may use a detected value by the tank pressure sensor 75 of the hydrogen filling device 70 as the tank pressure. Once the hydrogen filling device 70 confirms that no leakage of hydrogen exists in the hydrogen tank 60 or the like by pre-filling, the hydrogen filling device 70 starts operation of filling hydrogen into the hydrogen tank 60. The controller 78 of the hydrogen filling device 70 may use either the first sensor value $P_1$ that is the detected value by the filling pressure sensor 41 transmitted from the fuel cell vehicle 20 or the detected value by the tank pressure sensor 75 on the hydrogen filling device 70, as the tank pressure to control a flow rate of hydrogen supplied when hydrogen is filled. When filling hydrogen by the hydrogen filling device 70 is completed, the nozzle 72 is disengaged from the receptacle 64 and the lid 24 is closed.

When the lid sensor 46 detects that the lid 24 is closed as described above, the controller 68 of the fuel cell vehicle 20 instructs the transmitter 65 to stop transmitting the tank information signal.

Returning to FIG. 2, when the first sensor value $P_1$ is lower than the first reference pressure Pa in the step S110 (step S110: YES), it can be determined that the pressure in the filling piping 30, which is normally at the same pressure as that in the hydrogen tank 60, is lower than the lowest pressure during use of the hydrogen tank 60. A case where the first sensor value $P_1$ is lower than the first reference pressure Pa in the step S110 may occur, for example, when at least one of the hydrogen tank 60 and the filling piping 30 has leakage, which is referred to as a first case. In addition, it may also occur when the filling piping 30 has been opened to the atmosphere due to maintenance such as exchange of parts disposed in the filling piping 30 or inspection or the like, which is referred to as a second case. Accordingly, if the first sensor value $P_1$ is lower than the first reference pressure Pa in the step S110 (step S110: YES), the CPU of the controller 68 obtains detected signals by the second pressure sensors, that is, detected signals by the high pressure sensor 42, the medium pressure sensor 43, and the low pressure sensor 44 (step S140). A value of pressure in the supply piping 32 detected by each of the second pressure sensors is also referred to as a "second sensor value $P_2$".

After obtaining the detected signals by the second pressure sensors, the CPU of the controller 68 generates tank information indicating that the tank pressure is a second sensor value $P_2$ (step S160). Then, the controller 68 instructs the transmitter 65 to start transmitting a tank information signal indicating that the tank pressure is the second sensor value $P_2$ (step S170). In the step S160, any of the values of pressure detected by the high pressure sensor 42, the medium pressure sensor 43, and the low pressure sensor 44 may be used as the second sensor value $P_2$. The tank information signal indicating that the tank pressure is the second sensor value $P_2$ is also referred to as a "second signal".

As described above, in the step S170, when transmission indicating the second sensor value $P_2$ as the tank information signal is started, the hydrogen filling device 70 that has received the tank information signal starts the series of operations relating to filling hydrogen. Specifically, the pre-filling is performed at first. The pre-filling supplies the hydrogen tank 60 with hydrogen.

After the transmission of the tank information signal is started in the step S170, the CPU of the controller 68 obtains a first sensor value $P_1$ from the filling pressure sensor 41 again (step S180). Then, the CPU of the controller 68 compares the obtained first sensor value $P_1$ with a predetermined second reference pressure Pb (step S190). In the present embodiment, the second reference pressure Pb is set to the same pressure as the first reference pressure Pa and the lowest pressure during use, that is, 0.5 MPa. The second reference pressure Pb is predetermined to be higher than the atmospheric pressure and may be set to a value equal to or higher than the first reference pressure Pa, for example. The CPU of the controller 68 repeats operation in the steps S180 and S190 until it is determined that the first sensor value $P_1$ is equal to or higher than the second reference pressure Pb in the step S190.

Meanwhile, if the CPU of the controller 68 repeats the operation in the steps S180 and S190, it means that the first sensor value $P_1$ has been determined to be lower than the first reference pressure Pa in the step S110 previously performed, as described above. As a case where the first sensor value $P_1$ is lower than the first reference pressure Pa in the step S110 (step S110: YES), the first case or the second case is considered, as described above. In the case of the second case, the series of operations relating to filling hydrogen by the hydrogen filling device 70 is started after the step S170, which raises the pressure in the filling piping 30. As a result, the first sensor value $P_1$ is raised to be equal to or higher than the second reference pressure Pb.

In the case of the second case and it is determined that the first sensor value $P_1$ is equal to or higher than the second reference pressure Pb in the step S190 (step S190: YES), the CPU of the controller 68 changes the tank pressure in the tank information signal to be transmitted to the first sensor value $P_1$ (step S195) and terminates the routine. In the hydrogen filling device 70, the series of operations relating to filling hydrogen has been started as described above. As a result of the step S195, operation of filling hydrogen using the first sensor value $P_1$ as the tank pressure is enabled in the hydrogen filling device 70. When the lid sensor 46 detects that the lid 24 is closed after filling hydrogen is completed by the hydrogen filling device 70, the controller 68 of the fuel cell vehicle 20 instructs the transmitter 65 to stop transmitting the tank information signal.

In the case of the first case where leakage of hydrogen exists, even if the series of operations relating to filling hydrogen is started in the hydrogen filling device 70 after the step S170, the first sensor value $P_1$ may not become equal to or higher than the second reference pressure Pb in the step S190. In such a case, the hydrogen filling device 70 can detect the leakage during the pre-filling and thus stop the operation of filling hydrogen.

According to the fuel cell system 25 configured as described above in the present embodiment, upon determination that filling hydrogen into the hydrogen tank 60 is about to start, the transmitter 65 of the fuel cell vehicle 20 transmits the signal indicating that the tank pressure is the first sensor value $P_1$, when the first sensor value detected by the filling pressure sensor 41 is equal to or higher than the first reference pressure Pa predetermined as the lowest pressure during use of the hydrogen tank 60. On the other hand, the transmitter 65 transmits the signal indicating that the tank pressure is the second sensor value $P_2$, when the first sensor value is lower than the first reference pressure. Therefore, if no leakage exists in the hydrogen tank 60 and the filling piping 30, and the filling piping 30 has been opened to the atmosphere due to the maintenance or the like such as change of parts disposed in the filling piping 30, the transmitter 65 transmits the tank information signal indicating the second sensor value $P_2$ to the hydrogen filling device 70, instead of the first sensor value $P_1$ lower than the first reference pressure Pa, so that filling hydrogen can be started. There is a type of hydrogen filling device 70 that determines that leakage exists in the hydrogen tank 60 if it receives a signal indicating that the tank pressure is lower than a reference pressure such as the lowest pressure during use as a tank information signal and thus does not start operation of filling hydrogen. In the present embodiment, if the first sensor value $P_1$ is lower than the first reference pressure Pa, the transmitter 65 transmits the signal indicating that the tank pressure is the second sensor value $P_2$. Therefore, if no defect such as leakage in the hydrogen tank 60 exists and the first sensor value $P_1$ is lower than the lowest pressure during use due to maintenance or the like relating to the filling piping 30, operation of filling hydrogen can be performed. That is, according to the present embodiment, it is possible to increase a case where filling hydrogen is enabled when no leakage exists and thus filling hydrogen is possible, regardless of a type of the hydrogen filling device 70, while filling hydrogen is suppressed when leakage exists in the hydrogen tank 60 or the like.

Moreover, according to the fuel cell system 25 in the present embodiment, the first sensor value detected by the first pressure sensor (filling pressure sensor 41) disposed in the filling flow path and the second sensor value detected by any one of the second pressure sensors (the high pressure sensor 42, the medium pressure sensor 43, and the low pressure sensor 44) disposed in the supply flow path are used to transmit the tank information signal. Accordingly, different from the case where another pressure sensor is disposed in the hydrogen tank 60, the valve mechanism 62 disposed in the tank mouthpiece of the hydrogen tank 60 can be restrained from getting larger and complicated. Furthermore, the fuel cell system 25 can be restrained from getting complicated by using the high pressure sensor 42, the medium pressure sensor 43, and the low pressure sensor 44 that are pressure sensors used for power generation control of the fuel cell 66.

It may be possible that the fuel cell system 25 adopts a configuration in which the fuel cell vehicle 20 transmits a tank information signal indicating that the tank pressure is the second sensor value $P_2$ when filling hydrogen is started, regardless of whether the first sensor value $P_1$ is lower than the first reference pressure Pa. However, the second sensor value $P_2$ is sometimes less accurate than the first sensor value $P_1$ as a value representing the tank pressure. Specifically, there is a case where after the valve one 53 is closed when the fuel cell 66 stops generating electricity, in order to examine whether leakage exists in the valve one 53, a small amount of hydrogen is injected from the injector 55, so that leakage in the valve one 53 is examined based on a detected value by the high pressure sensor 42 or the medium pressure sensor 43, for example. If leakage exists in the valve one 53, the detected value by the high pressure sensor 42 or the medium pressure sensor 43 does not fall, or it falls once and then rises. When such an examination is performed, if no defect exists in the valve one 53, the second sensor value $P_2$ falls due to injection of hydrogen from the injector 55, and thus the second sensor value $P_2$ becomes less accurate than the first sensor value $P_1$ as the value representing the tank pressure. According to the present embodiment, the first sensor value $P_1$, which is more accurate, can be used with priority as the tank pressure indicated by the tank information signal. In addition, when filling hydrogen is started using the first sensor value $P_1$, the tank pressure indicated by the tank information signal does not need to be changed in the middle of operation when filling hydrogen continues without hindrance.

B. Second Embodiment

Figure 3:
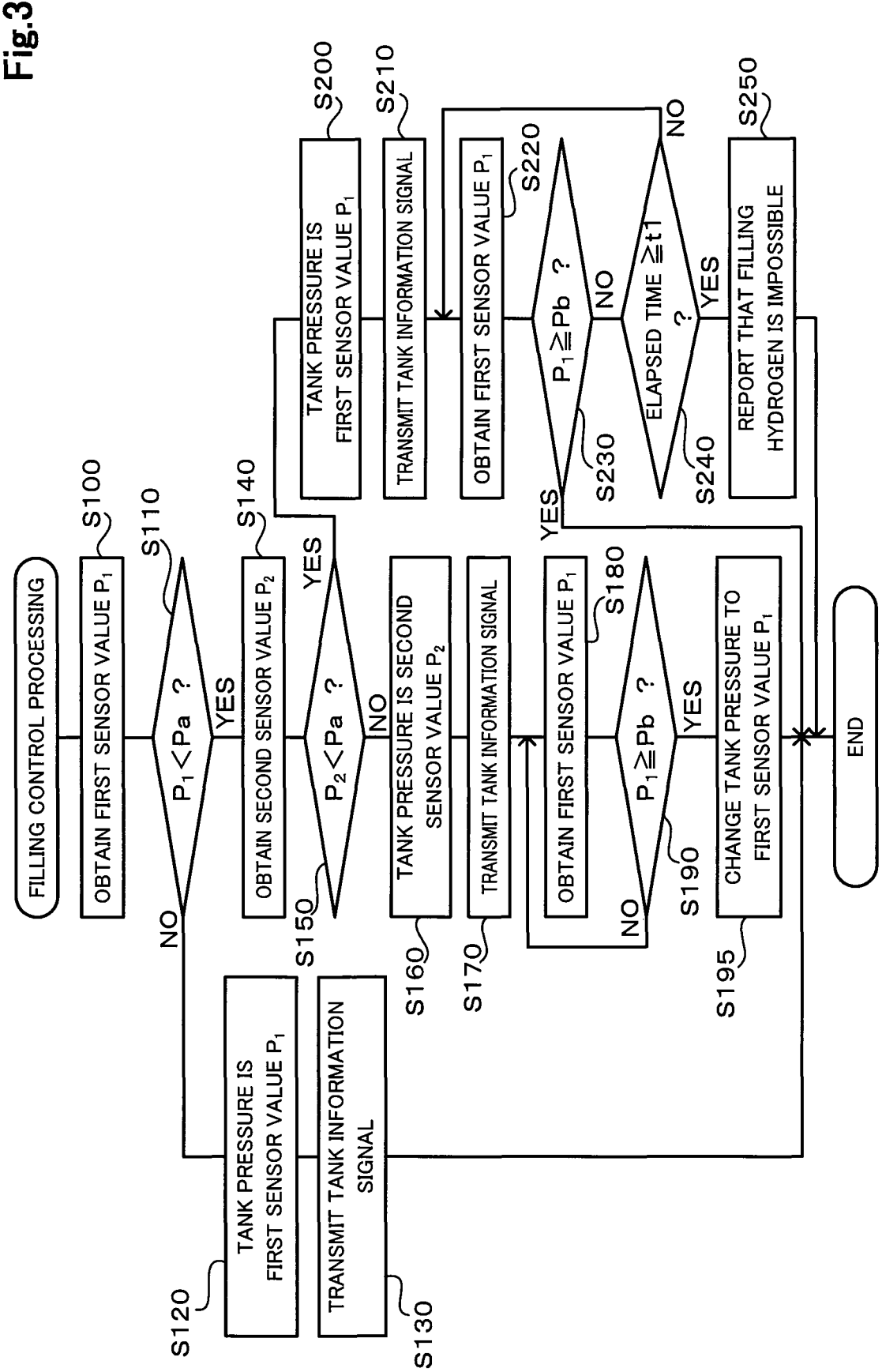
FIG. 3 is a flowchart illustrating a routine of filling control processing.

FIG. 3 is a flowchart illustrating a filling control processing routine executed by the CPU of the controller 68 when filling hydrogen into the hydrogen tank 60 is started in the fuel cell system 25 according to a second embodiment of the present disclosure. The hydrogen filling system 10 including the fuel cell system 25 according to the second embodiment has the same configuration as that of the hydrogen filling system 10 in the first embodiment shown in FIG. 1. The filling control processing routine shown in FIG. 3 is performed in place of the filling control processing routine in the first embodiment shown in FIG. 2. In FIG. 3, procedures that are the same as those in FIG. 2 are denoted with the same step numbers as those in FIG. 2, and detailed description thereof will be omitted.

The second embodiment is different from the first embodiment in operation after it is determined that the first sensor value $P_1$ is lower than the first reference pressure Pa in the step S110 (step S110: YES) and a detected signal by the second pressure sensor is obtained in the step S140. In the second embodiment, the CPU of the controller 68 compares the second sensor value $P_2$ with the first reference pressure Pa (step S150) after the step S140. In the step S150, if the pressure detected by any one of the high pressure sensor 42, the medium pressure sensor 43, and the low pressure sensor 44, which are the second pressure sensors, is equal to or higher than the first reference pressure Pa, it is determined that the second sensor value $P_2$ is equal to or higher than the first reference pressure Pa.

When the second sensor value $P_2$ is equal to or higher than the first reference pressure Pa in the step S150 (step S150: NO), the CPU of the controller 68 executes operation in and after the step S160 described above. At this time, in the step S160, the second sensor value $P_2$ may be any one of the pressures determined to be equal to or higher than the first reference pressure Pa, among the pressures detected by the high pressure sensor 42, the medium pressure sensor 43, and the low pressure sensor 44.

In the step S150, when the second sensor value $P_2$ is lower than the first reference pressure Pa (step S150: YES), the CPU of the controller 68 generates tank information indicating that the tank pressure is the first sensor value $P_1$ (step S200). Then, the controller 68 instructs the transmitter 65 to transmit a tank information signal indicating that the tank pressure is the first sensor value $P_1$ (step S210). As a result, the hydrogen filling device 70 that has received the tank information signal starts the series of operations relating to filling hydrogen.

In the step S150, when the second sensor value $P_2$ is lower than the first reference pressure Pa (step S150: YES), pressure in the supply piping 32 is lower than the lowest pressure during use of the hydrogen tank 60. Such a situation may occur, for example, when the supply piping 32 has been opened to the atmosphere due to maintenance or the like such as exchange of parts disposed in the supply piping 32, which is referred to as a third case. Meanwhile, determination in the step S150 is performed on the premise that the first sensor value $P_1$ has been determined to be lower than the first reference pressure Pa in the step S110 previously performed (step S110: YES). Such a situation may occur in the first case where leakage exists in the hydrogen tank 60 or the like or in the second case where the filling piping 30 has been opened to the atmosphere due to maintenance or the like, as described above. In the case other than the first case where leakage exists in the hydrogen tank 60 or the like out of these cases, once the series of operations relating to filling hydrogen by the hydrogen filling device 70 is started after the step S210, filling hydrogen is enabled without hindrance.

After the step S210, the CPU of the controller 68 performs operation to obtain a first sensor value $P_1$ from the filling pressure sensor 41 (step S220) and operation to compare the obtained first sensor value $P_1$ with the second reference pressure Pb (step S230). Then, if the CPU of the controller 68 determines that the first sensor value $P_1$ is lower than the second reference pressure Pb in the step S230 (step S230: NO), the CPU of the controller 68 compares elapsed time since the transmission of the tank information signal is started in the step S210 with a predetermined reference time t1 (step S240). The reference time t1 is predetermined as time needed to raise the first sensor value $P_1$, which is approximately the same as the atmospheric pressure, to be equal to or higher than the second reference pressure Pb, based on capacities of the hydrogen tank 60 and the filling piping 30 and a flow rate under pre-filling conditions in the hydrogen filling device 70 if no leakage exists in the hydrogen tank 60 or the like. When the first sensor value $P_1$ is lower than the second reference pressure Pb, the CPU of the controller 68 repeats the operation in the steps S220 to S240 until the reference time t1 passes.

When the CPU of the controller 68 determines that the first sensor value $P_1$ is equal to or higher than the second reference pressure Pb in the step S230 (step S230: YES) before the reference time t1 passes (step S240: NO), the CPU of the controller 68 terminates the routine. Such operation is performed in a case other than the first case where leakage exists in the hydrogen tank 60 or the like and when the hydrogen filling device 70 is a first type device that starts the series of operations relating to filling hydrogen including the pre-filling even if tank pressure indicated by a received tank information signal is lower than the lowest pressure during use. As described above, in the case other than the first case where leakage exists in the hydrogen tank 60 or the like, once the series of operations relating to filling hydrogen by the hydrogen filling device 70 is started, filling hydrogen into the hydrogen tank 60 is enabled without hindrance. Therefore, if the series of operations relating to filling hydrogen is started after the step S210, pressure in the filling piping 30 is immediately raised, so that the first sensor value $P_1$ becomes equal to or higher than the second reference pressure Pb. Subsequently, the hydrogen filling device 70 continues filling hydrogen operation. Then, when the lid sensor 46 detects that the lid 24 is closed after filling hydrogen by the hydrogen filling device 70 is completed, the controller 68 of the fuel cell vehicle 20 instructs the transmitter 65 to stop transmitting the tank information signal.

If it is determined that the reference time t1 has passed in the step S240 (step S240: YES), the CPU of the controller 68 instructs the informing unit 67 to display the information that filling hydrogen is impossible (step S250) and terminates the routine. Such operation is performed in the first case where leakage exists in the hydrogen tank 60 or the like, or when the hydrogen filling device 70 is a second type device that does not start the series of operations relating to filling hydrogen if tank pressure indicated by a received tank information signal is lower than the lowest pressure during use. In the first case where leakage exists in the hydrogen tank 60 or the like, even if filling hydrogen is started, the first sensor value $P_1$ does not reach the second reference pressure Pb within the reference time t1. In addition, when the hydrogen filling device 70 is the second type device, the hydrogen filling device 70 does not start the series of operations relating to filling hydrogen, and thus the first sensor value $P_1$ does not reach the second reference pressure Pb within the reference time t1. In such cases, the CPU of the controller 68 reports that filling hydrogen is impossible in the step S250 in the present embodiment.

Such a configuration can provide the same advantageous effects as those of the first embodiment. Specifically, even in the second case where the filling piping 30 has been opened to the atmosphere due to maintenance or the like (step S110: YES) and when the hydrogen filling device 70 is the second type device that does not start the series of operations relating to filling hydrogen if the tank pressure indicated by the received tank information signal is lower than the lowest pressure during use, filling hydrogen into the hydrogen tank 60 is enabled as long as the second sensor value $P_2$ is equal to or higher than the first reference pressure Pa (step S150:

NO), by transmitting the tank information signal indicating the second sensor value $P_2$ to the hydrogen filling device 70 (step S160 and step S170).

C. Third Embodiment

Figure 4:
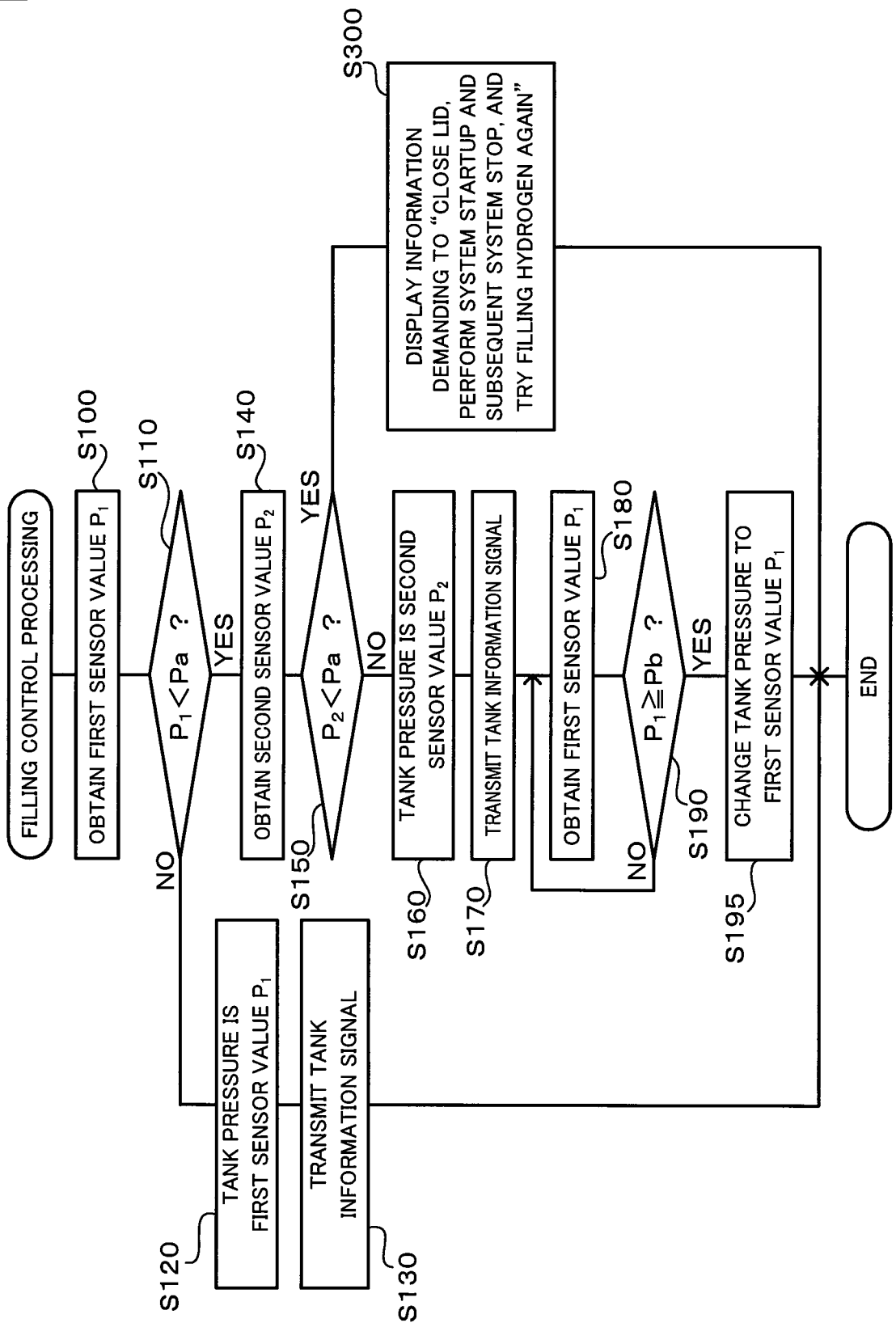
FIG. 4 is a flowchart illustrating a routine of filling control processing.

FIG. 4 is a flowchart illustrating a filling control processing routine executed by the CPU of the controller 68 when filling hydrogen into the hydrogen tank 60 is started in the fuel cell system 25 according to a third embodiment of the present disclosure. The hydrogen filling system 10 including the fuel cell system 25 according to the third embodiment has the same configuration as that of the hydrogen filling system 10 in the first embodiment shown in FIG. 1. The filling control processing routine shown in FIG. 4 is performed in place of the filling control processing routine in the first embodiment shown in FIG. 2. In FIG. 4, procedures that are the same as those in FIG. 2 of the first embodiment and FIG. 3 of the second embodiment are denoted with the same step numbers as those in FIG. 2 and FIG. 3, and detailed description thereof will be omitted.

Third embodiment is different from the second embodiment in operation after it is determined that the second sensor value $P_2$ is lower than the first reference pressure Pa in the step S150 (step S150: YES). If the CPU of the controller 68 determines that the second sensor value $P_2$ is lower than the first reference pressure Pa in the step S150 (step S150: YES), the CPU of the controller 68 instructs the informing unit 67 to display the information demanding to "closes the lid, perform system startup and subsequent system stop in the fuel cell vehicle 20, and try filling hydrogen again" (step S300), and terminates the routine.

Such a configuration can provide the same advantageous effects as those of the first and second embodiments. Specifically, even in the second case where the filling piping 30 has been opened to the atmosphere due to maintenance or the like (step S110: YES) and when the hydrogen filling device 70 is the second type device that does not start the series of operations relating to filling hydrogen if the tank pressure indicated by the received tank information signal is lower than the lowest pressure during use, filling hydrogen into the hydrogen tank 60 is enabled as long as the second sensor value $P_2$ is equal to or higher than the first reference pressure Pa (step S150: NO), by transmitting the tank information signal indicating the second sensor value $P_2$ to the hydrogen filling device 70 (step S160 and step S170).

Moreover, according to the third embodiment, even if the second sensor value $P_2$ is lower than the first reference pressure Pa (step S150: YES) and when the hydrogen filling device 70 is the second type device, filling hydrogen is enabled. When the second sensor value $P_2$ is lower than the first reference pressure Pa and the hydrogen filling device 70 is the second type device, the hydrogen filling device 70 does not start the series of operations relating to filling hydrogen even if the hydrogen filling device 70 receives the tank information signal indicating that the tank pressure is the second sensor value $P_2$, as described in the first embodiment. In the step S300 in the present embodiment, information demanding system startup and system stop of the fuel cell vehicle 20 and a retry of filling hydrogen is reported, so that hydrogen can be supplied to the fuel cell 66 from the hydrogen tank 60 due to the system startup. Accordingly, the second sensor value $P_2$ can become equal to or higher than the first reference pressure Pa, and when the lid 24 is opened and the nozzle 72 is engaged with the receptacle 64 to try filling hydrogen again, the fuel cell vehicle 20 can transmit a tank information signal indicating that the tank pressure is the second sensor value $P_2$ that is equal to or higher than the first reference pressure Pa. Consequently, filling hydrogen into the hydrogen tank 60 is enabled.

D. Fourth Embodiment

Figure 5:
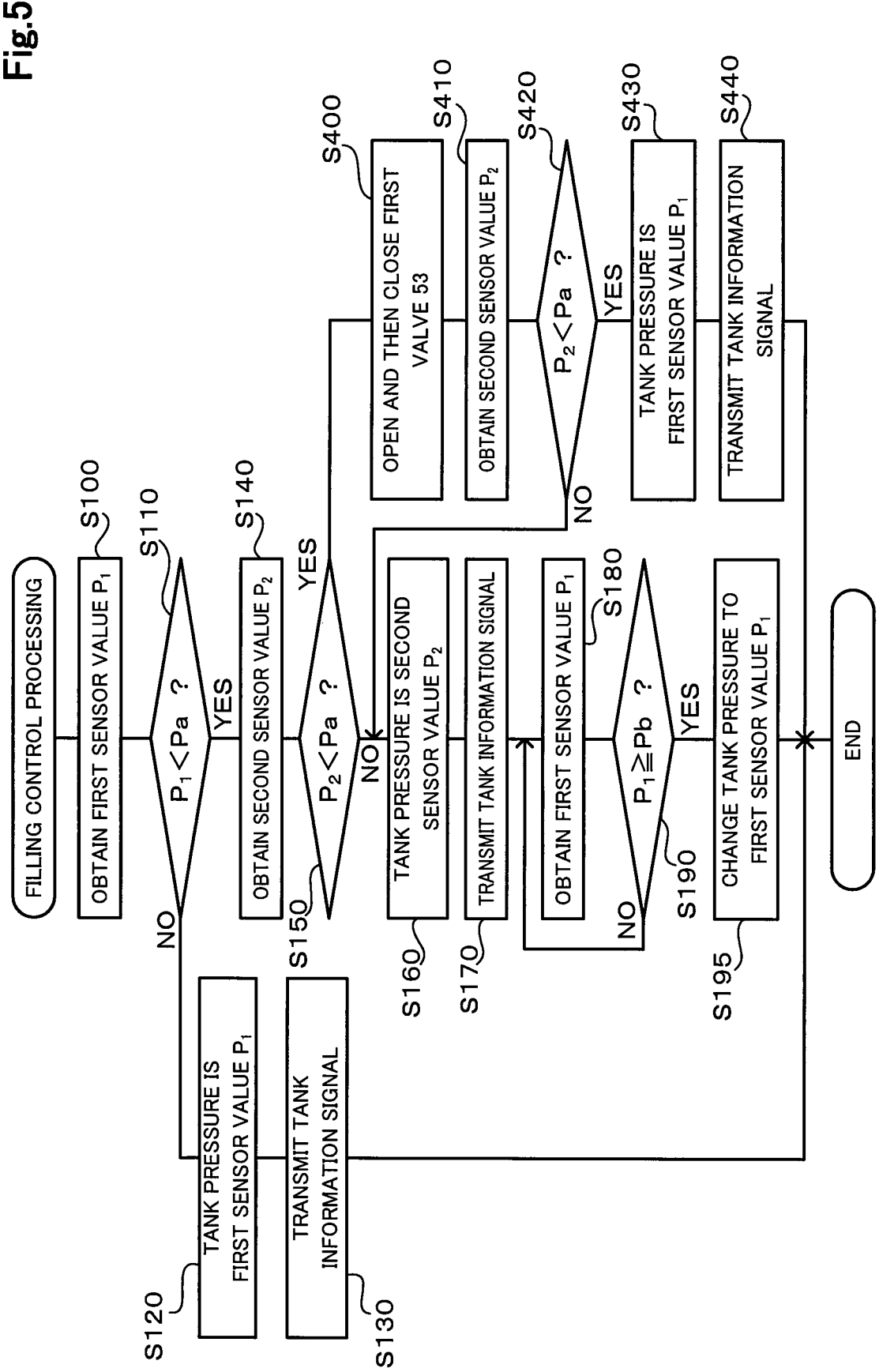
FIG. 5 is a flowchart illustrating a routine of filling control processing.

FIG. 5 is a flowchart illustrating a filling control processing routine executed by the CPU of the controller 68 when filling hydrogen into the hydrogen tank 60 is started in the fuel cell system 25 according to a fourth embodiment of the present disclosure. The hydrogen filling system 10 including the fuel cell system 25 according to the fourth embodiment has the same configuration as that of the hydrogen filling system 10 in the first embodiment shown in FIG. 1. The filling control processing routine shown in FIG. 5 is performed in place of the filling control processing routine in the first embodiment shown in FIG. 2. In FIG. 5, procedures that are the same as those in FIG. 2 of the first embodiment and FIG. 3 of the second embodiment are denoted with the same step numbers as those in FIG. 2 and FIG. 3, and detailed description thereof will be omitted.

The fourth embodiment is different from the second embodiment in operation after it is determined that the second sensor value $P_2$ is lower than the first reference pressure Pa in the step S150 (step S150: YES). In the step S150, if the CPU of the controller 68 determines that the second sensor value $P_2$ is lower than the first reference pressure Pa (step S150: YES), the CPU of the controller 68 performs operation to open and then close the valve one 53 (step S400). Time to open the valve one 53 in the step S400 is predetermined as time needed to make a detected value by the high pressure sensor 42 exceed the first reference pressure Pa by opening the valve one 53, when the pressure in the hydrogen tank 60 exceeds the first reference pressure Pa, for example. If no leakage exists in the supply flow path on an upstream side of the injector 55 and the hydrogen tank 60, the operation in the step S400 raises detected values by the high pressure sensor 42 and the medium pressure sensor 43. The operation in the step S400 is also referred to as "boosting operation". In addition, the CPU of the controller 68 configured to perform operation in the step S400 functions as a "pressure adjusting unit".

After the step S400, the CPU of the controller 68 obtains a second sensor value $P_2$ that is a detected signal by any one of the second pressure sensors (step S410), and then compares the second sensor value $P_2$ with the first reference pressure Pa (step S420). The operation in the steps S410 and S420 is the same as that in the steps S140 and S150. However, in the steps S410 and S420, the low pressure sensor 44 is not included in the second pressure sensors, and a detected value by the low pressure sensor 44 is not included in the second sensor value $P_2$. This is because the injector 55 is closed when the boosting operation in the step S400 is performed, and thus pressure in the supply piping 32 at a part where the low pressure sensor 44 is disposed does not rise.

When the second sensor value $P_2$ is equal to or higher than the first reference pressure Pa in the step S420 (step S420: NO), the CPU of the controller 68 transfers to the step S160 and performs processing in and after the step S160.

In the step S420, when the second sensor value $P_2$ is lower than the first reference pressure Pa (step S420: YES), the CPU of the controller 68 generates tank information indicating that the tank pressure is the first sensor value $P_1$ (step S430). Then, the CPU of the controller 68 instructs the transmitter 65 to start transmitting a tank information signal indicating that the tank pressure is the first sensor value $P_1$ (step S440) and terminates the routine.

Such a configuration can provide the same advantageous effects as those in the first to the third embodiments. Specifically, even in the second case where the filling piping 30 has been opened to the atmosphere due to maintenance or the like (step S110: YES) and when the hydrogen filling device 70 is the second type device that does not start the series of operations relating to filling hydrogen if the tank pressure indicated by the received tank information signal is lower than the lowest pressure during use, filling hydrogen into the hydrogen tank 60 is enabled as long as the second sensor value $P_2$ is equal to or higher than the first reference pressure Pa (step S150: NO), by transmitting the tank information signal indicating the second sensor value $P_2$ to the hydrogen filling device 70 (step S160 and step S170).

Moreover, according to the fourth embodiment, even if the second sensor value $P_2$ is lower than the first reference pressure Pa (step S150: YES) and when the hydrogen filling device 70 is the second type device described above, filling hydrogen is enabled. When the second sensor value $P_2$ is lower than the first reference pressure Pa and the hydrogen filling device 70 is the second type device, the hydrogen filling device 70 does not start the series of operations relating to filling hydrogen even if the hydrogen filling device 70 receives the tank information signal indicating that the tank pressure is the second sensor value $P_2$, as described in the first embodiment. In the step S400 in the present embodiment, the operation to open and then close the valve one 53 can supply hydrogen to the fuel cell 66 from the hydrogen tank 60. As a result, the second sensor value $P_2$ can become equal to or higher than the first reference pressure Pa. Therefore, the transmission of a tank information signal indicating the second sensor value $P_2$ thus obtained as the tank pressure makes filling hydrogen into the hydrogen tank 60 possible. Moreover, the fourth embodiment can provide an advantageous effect of saving operation from a user, unlike the third embodiment.

E. Fifth Embodiment

Figure 6:
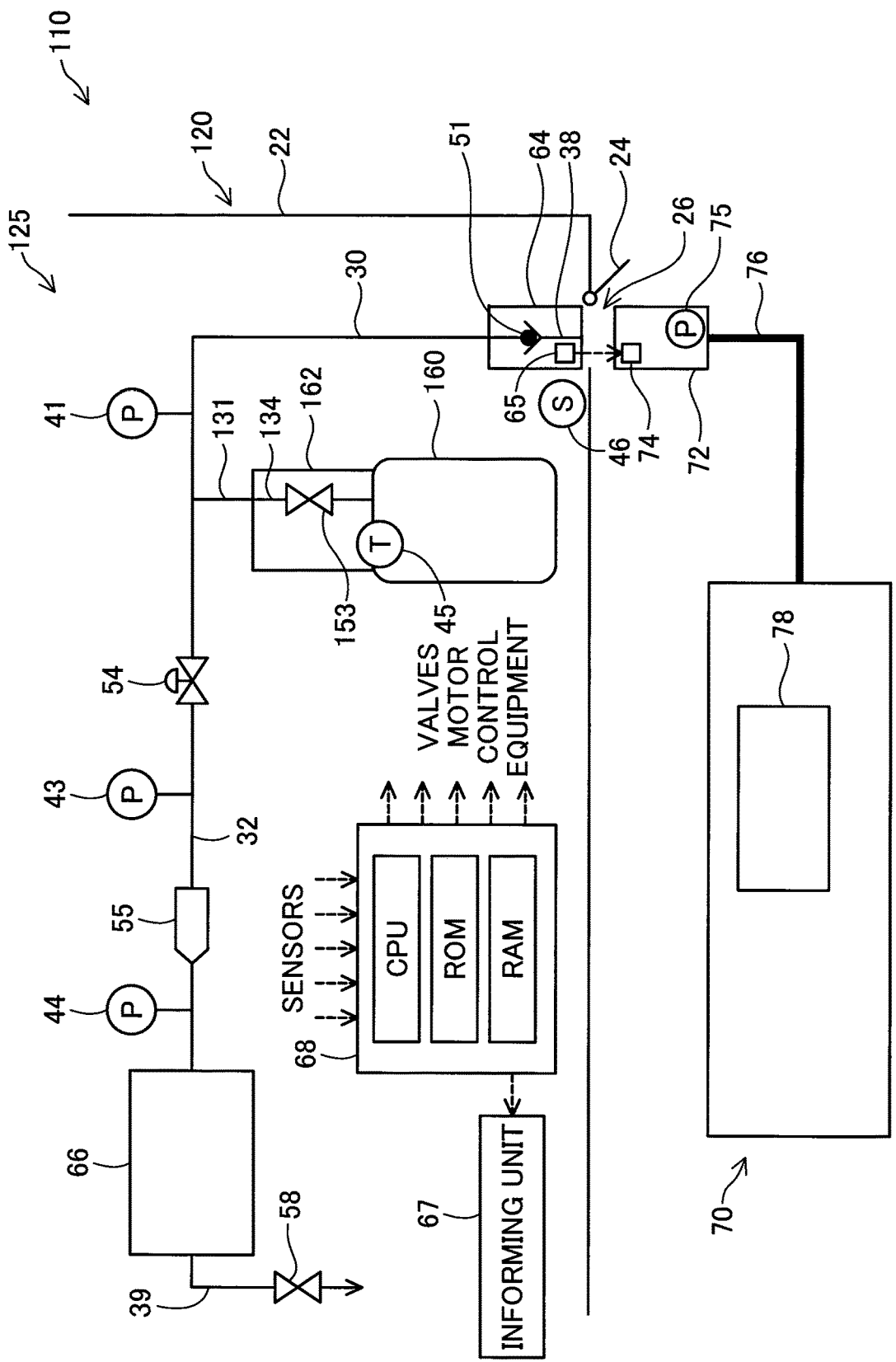
FIG. 6 is an explanatory diagram illustrating a schematic configuration of a fuel cell system.

FIG. 6 is an explanatory diagram illustrating a schematic configuration of a fuel cell system 125 according to a fifth embodiment. The fuel cell system 125 is installed in a fuel cell vehicle 120 which constitutes a hydrogen filling system 110 along with the hydrogen filling device 70. In the hydrogen filling system 110 in the fifth embodiment, components that are the same as those in the first embodiment are denoted with the same reference numerals as those in the first embodiment, and detailed description thereof will be omitted.

A hydrogen tank 160 in the fifth embodiment is different from the tank in the first to fourth embodiments in a configuration of a valve mechanism. In addition, the fuel cell system 125 in the present embodiment is different from the fuel cell system in the first to fourth embodiments in an aspect of connection of the valve mechanism to the filling flow path and the supply flow path. The valve mechanism 162 in the present embodiment includes an in-valve flow path 134 formed. One end of the in-valve flow path 134 is open to a surface of the valve mechanism 162 while the other end of the in-valve flow path 134 is open in the hydrogen tank 160. In the in-valve flow path 134, a valve three 153 is disposed. The valve three 153 has a function as an electromagnetic valve configured to open by current application and a function as a check valve configured to allow a hydrogen flow in a direction only from one end to the other end of the in-valve flow path 134 when current is not applied.

One end of the in-valve flow path 134 open to the surface of the valve mechanism 162 is connected to one end of a connecting piping 131. The other end of the connecting piping 131 is connected to both the filling piping 30 and the supply piping 32.

In the present embodiment, the "filling flow path" connecting the filler port 26 and the hydrogen tank 160 includes the filling piping 30, the connecting piping 131, and the in-valve flow path 134. In the present embodiment, the first check valve 51 is also referred to as the "first valve", as in the first embodiment. The filling pressure sensor 41 is also referred to as the "first pressure sensor", as in the first embodiment. In the fuel cell vehicle 120, when hydrogen is filled into the hydrogen tank 160, high-pressure hydrogen is supplied from the hydrogen filling device 70, which opens the first check valve 51 and the valve three 153 that is in a non-energized state and functions as the check valve. The valve three 153 is disposed in the filling flow path between the first pressure sensor and the hydrogen tank 160. When hydrogen is filled into the hydrogen tank 160, the valve three 153 allows a hydrogen flow only from the filler port 26 toward the hydrogen tank 160. The valve three 153 is also referred to as the "second valve". When hydrogen is filled, pressure detected by the filling pressure sensor 41 is approximately the same as the tank pressure.

In the present embodiment, the "supply flow path" connecting the fuel cell 66 and the hydrogen tank 160 includes the supply piping 32, the connecting piping 131, and the in-valve flow path 134. In the present embodiment, the low pressure sensor 44 is also referred to as the "second pressure sensor". In addition, the injector 55 is a valve disposed in the supply flow path between the hydrogen tank 160 and the low pressure sensor 44 serving as the second pressure sensor, configured to open and close the supply flow path, and also configured to be closed when hydrogen is filled into the hydrogen tank 160. Thus, the injector 55 is also referred to as the "third valve". Moreover, the valve two 58 is a valve disposed on a downstream side of the low pressure sensor 44 serving as the second pressure sensor in a hydrogen flow flowing when the fuel cell 66 generates electricity, and configured to open and close the flow path. The valve two 58 is also referred to as the "fourth valve". When the fuel cell 66 generates electricity, the valve three 153 functions as the electromagnetic valve to be opened, so that pressure in the filling piping 30 on a side of the hydrogen tank 160 of the first check valve 51 becomes approximately equal to the tank pressure. At this time, the filling pressure sensor 41 can function similarly to the high pressure sensor 42 disposed in the fuel cell system 25 in FIG. 2.

FIG. 7 is a flowchart illustrating a filling control processing routine executed by the CPU of the controller 68 when filling hydrogen into the hydrogen tank 160 is started in the fuel cell system 125 according to the fifth embodiment. The filling control processing routine shown in FIG. 7 is performed similarly to the filling control processing routine in the fourth embodiment shown in FIG. 5, and thus procedures in FIG. 7 that are the same as those in FIG. 5 are denoted with the same step numbers as those in FIG. 5, and detailed description thereof will be omitted.

The fifth embodiment is different from the fourth embodiment in operation after it is determined that the second sensor value $P_2$ is lower than the first reference pressure Pa in the step S150 (step S150: YES). If the CPU of the controller 68 determines that the second sensor value $P_2$ is lower than the first reference pressure Pa in the step S150 (step S150: YES), the CPU of the controller 68 performs operation to open and then close the valve three 153 (step S500). Time to open the valve three 153 in the step S500 is predetermined as time needed to make a detected value by the filling pressure sensor 41 exceed the first reference pressure Pa by opening the valve three 153, when the pressure in the hydrogen tank 160 exceeds the first reference pressure Pa, for example.

After the step S500, the CPU of the controller 68 obtains a first sensor value $P_1$ that is a detected signal by the filling pressure sensor 41 serving as the first pressure sensor (step S510), and then compare the first sensor value $P_1$ with the first reference pressure Pa (step S520).

When the first sensor value $P_1$ is equal to or higher than the first reference pressure Pa in the step S520 (step S520: NO), the CPU of the controller 68 transfers to the step S120 and performs processing in and after the step S120. That is, the CPU of the controller 68 generates tank information indicating that the tank pressure is the first sensor value $P_1$ (step S120), instructs the transmitter 65 to start transmitting a tank information signal indicating that the tank pressure is the first sensor value $P_1$ (step S130) and terminates the routine.

When the first sensor value $P_1$ is lower than the first reference pressure Pa in the step S520 (step S520: YES), the CPU of the controller 68 instructs the informing unit 67 to display information that filling hydrogen is impossible (step S530) and terminates the routine.

Such a configuration can provide the same advantageous effects as those of the fourth embodiment.

In the fuel cell system 125 according to the fifth embodiment shown in FIG. 6, the same control as that in the first embodiment shown in FIG. 2, in the second embodiment shown in FIG. 3, or in the third embodiment shown in FIG. 4 may be performed. In such a case, the same advantageous effects as those in the first to the third embodiments can be provided.

F. Alternative Embodiments (E1) In each of the aforementioned embodiments, the fuel cell system includes only one hydrogen tank; however, it may include a plurality of hydrogen tanks. When a configuration including the plurality of hydrogen tanks is adopted, the plurality of hydrogen tanks may be connected in parallel to the supply piping and the filling piping, for example. When the plurality of the hydrogen tanks 60 are disposed in the fuel cell system 25 shown in FIG. 1 in such a manner, another check valve may be disposed in the second flow path 36 in the valve mechanism 62 on a side of the fuel cell 66 of the valve one 53 so as to allow a hydrogen flow in a direction only from the plurality of hydrogen tanks 60 toward the fuel cell 66. Such a configuration can suppress a back flow of hydrogen between the plurality of hydrogen tanks.

(E2) In each of the aforementioned embodiments, the fuel cell 66 is installed in the fuel cell vehicle 20, however, another configuration may be adopted. For example, any other movable body such as a two-wheeled vehicle may be adopted as long as it includes a fuel cell serving as a driving energy source and a hydrogen tank.

The present disclosure is not limited to the aforementioned embodiments, and may be implemented in various ways without departing from the spirit and scope of the present disclosure. For example, the technical features that are described in the embodiments may be replaced and combined as appropriate to partially or entirely solve the problem described above, or partially or entirely achieve the effects described above. The technical features that are not described as an essential feature in the specification may be omitted as appropriate. For example, the present disclosure may be implemented as the following aspects.

(1) According to one aspect of the present disclosure, a fuel cell system is provided. The fuel cell system comprises a fuel cell, a hydrogen tank configured to store hydrogen, a filler port with which a hydrogen filling device configured to fill hydrogen into the hydrogen tank is engaged, a filling flow path connecting the filler port and the hydrogen tank, a supply flow path connecting the fuel cell and the hydrogen tank, a first pressure sensor disposed in the filling flow path and configured to detect pressure in the filling flow path, a first valve disposed in the filling flow path between the filler port and the first pressure sensor and configured to allow a hydrogen flow in a direction only from the filler port toward the hydrogen tank, a second valve disposed in the filling flow path between the first pressure sensor and the hydrogen tank and configured to allow the hydrogen flow in the direction only from the filler port toward the hydrogen tank when the hydrogen is filled into the hydrogen tank, a second pressure sensor disposed in the supply flow path and configured to detect pressure in the supply flow path, a sealing valve configured to seal a part of the supply flow path where the second pressure sensor is disposed in a non-generating state of the fuel cell, and a transmitter configured to transmit a signal indicating pressure in the hydrogen tank to the hydrogen filling device. Upon determination that filling hydrogen into the hydrogen tank is about to start, when a first sensor value detected by the first pressure sensor is equal to or higher than a reference pressure predetermined to be higher than the atmospheric pressure, the transmitter transmits a first signal indicating that the pressure in the hydrogen tank is the first sensor value, and when the first sensor value is lower than the reference pressure, the transmitter transmits a second signal indicating that the pressure in the hydrogen tank is a second sensor value detected by the second pressure sensor.

According to the fuel cell system in this aspect, even in the case where a hydrogen filling device to be used is configured not to start filling hydrogen when it receives a signal indicating that the pressure in the hydrogen tank is lower than the predetermined reference pressure, it is possible to reduce occurrence of a situation in which filling hydrogen is impossible though the hydrogen tank that has no defect such as leaking.

(2) In the fuel cell system in the aforementioned aspect, in a case that the first sensor value is lower than the reference pressure, when the second sensor value is equal to or higher than the reference pressure, the transmitter may transmit the second signal, and when the second sensor value is lower than the reference pressure, the transmitter may transmit the first signal instead of the second signal. According to the fuel cell system in this aspect, in the case where the hydrogen filling device to be used is configured not to start filling hydrogen when it receives a signal indicating that the pressure in the hydrogen tank is lower than the predetermined reference pressure, even if the first sensor value is lower than the reference pressure, it is possible to reduce occurrence of a situation in which filling hydrogen is impossible though the hydrogen tank that has no defect such as leaking, as long as the second sensor value is equal to or higher than the reference pressure.

(3) According to the aforementioned aspect, the fuel cell system may further comprise an informing unit configured to report information demanding a series of operations to start up and then stop the fuel cell system, when both the first sensor value and the second sensor value are lower than the reference pressure, upon determination that filling hydrogen into the hydrogen tank is about to start. According to the fuel cell system in this aspect, even if the second sensor value, as well as the first sensor value, is lower than the reference pressure, it is possible to reduce occurrence of a situation in which filling hydrogen is impossible though the hydrogen tank that has no defect such as leaking.

(4) According to the aforementioned aspect, the fuel cell system may further comprise a pressure adjusting unit configured to perform boosting operation to open and then close a third valve that is the sealing valve disposed in the supply flow path between the hydrogen tank and the second pressure sensor, when both the first sensor value and the second sensor value are lower than the reference pressure, upon determination that filling hydrogen into the hydrogen tank is about to start. Also, the transmitter may transmit a signal, as the second signal, indicating that the pressure in the hydrogen tank is a second sensor value detected by the second pressure sensor after the boosting operation. According to the fuel cell system in this aspect, even if the second sensor value, as well as the first sensor value, is lower than the reference pressure, it is possible to reduce occurrence of a situation in which filling hydrogen is impossible though the hydrogen tank that has no defect such as leaking.

The present disclosure may be implemented in various aspects such as a fuel cell vehicle equipped with a fuel cell system, a hydrogen filling system, a control method of a fuel cell system, a computer program for implementing the control method, and a non-transitory storage medium storing the computer program.

What is claimed is:

1. A fuel cell system comprising:
    a fuel cell;
    a hydrogen tank configured to store hydrogen;
    a filler port with which a hydrogen filling device configured to fill hydrogen into the hydrogen tank is engaged;
    a filling flow path connecting the filler port and the hydrogen tank;
    a supply flow path connecting the fuel cell and the hydrogen tank;
    a first pressure sensor disposed in the filling flow path and configured to detect pressure in the filling flow path;
    a first valve disposed in the filling flow path between the filler port and the first pressure sensor and configured to allow a hydrogen flow in a direction only from the filler port toward the hydrogen tank;
    a second valve disposed in the filling flow path between the first pressure sensor and the hydrogen tank and configured to allow the hydrogen flow in the direction only from the filler port toward the hydrogen tank when the hydrogen is filled into the hydrogen tank;
    a second pressure sensor disposed in the supply flow path and configured to detect pressure in the supply flow path;
    a sealing valve configured to seal a part of the supply flow path where the second pressure sensor is disposed in a non-generating state of the fuel cell;
    a transmitter configured to transmit a signal indicating pressure in the hydrogen tank to the hydrogen filling device, and a controller programmed to:
    determine that filling hydrogen into the hydrogen tank is about to start,
    select a first sensor value detected by the first pressure sensor or a second sensor value detected by the second pressure sensor as a pressure in the hydrogen tank based on whether the first sensor value is equal to or higher than a reference pressure predetermined to be higher than atmospheric pressure,
    and
    control the transmitter to transmit a first signal indicating that the pressure in the hydrogen tank is the selected first sensor value or second sensor value;
    wherein the controller is further programmed to select the first sensor value if the first sensor value is equal to or higher than the reference pressure and to select the second sensor value if the first sensor value is lower than the reference pressure.

2. The fuel cell system according to claim 1, wherein
    in a case that the first sensor value is lower than the reference pressure,
    when the second sensor value is equal to or higher than the reference pressure, the transmitter transmits the second signal, and
    when the second sensor value is lower than the reference pressure, the transmitter transmits the first signal instead of the second signal.

3. The fuel cell system according to claim 1, further comprising:
    an informing unit programmed to report information demanding a series of operations to start up and then stop the fuel cell system, when both the first sensor value and the second sensor value are lower than the reference pressure, upon determination that filling hydrogen into the hydrogen tank is about to start.

4. The fuel cell system according to claim 1, further comprising:
    a pressure adjusting unit programmed to perform boosting operation to open and then close a third valve that is the sealing valve disposed in the supply flow path between the hydrogen tank and the second pressure sensor, when both the first sensor value and the second sensor value are lower than the reference pressure, upon determination that filling hydrogen into the hydrogen tank is about to start;
    wherein the transmitter transmits a signal, indicating that the pressure in the hydrogen tank is the second sensor value detected by the second pressure sensor after the boosting operation.

5. A fuel cell vehicle comprising the fuel cell system according to claim 1.

6. A method for controlling a fuel cell system, the fuel cell system comprising
    a fuel cell,
    a hydrogen tank configured to store hydrogen,
    a filler port with which a hydrogen filling device configured to fill hydrogen into the hydrogen tank is engaged,
    a filling flow path connecting the filler port and the hydrogen tank,
    a supply flow path connecting the fuel cell and the hydrogen tank,
    a first pressure sensor disposed in the filling flow path and configured to detect pressure in the filling flow path,
    a first valve disposed in the filling flow path between the filler port and the first pressure sensor and configured to allow a hydrogen flow in a direction only from the filler port toward the hydrogen tank,
    a second valve disposed in the filling flow path between the first pressure sensor and the hydrogen tank and configured to allow the hydrogen flow in the direction only from the filler port toward the hydrogen tank when the hydrogen is filled into the hydrogen tank, a second pressure sensor disposed in the supply flow path and configured to detect pressure in the supply flow path,
a sealing valve configured to seal a part of the supply flow path where the second pressure sensor is disposed in a non-generating state of the fuel cell, and
a transmitter configured to transmit a signal indicating pressure in the hydrogen tank to the hydrogen filling device, and the method comprising: upon determination that filling hydrogen into the hydrogen tank is about to start,
  instructing the transmitter to transmit a first signal indicating that the pressure in the hydrogen tank is a first sensor value, if the first sensor value detected by the first pressure sensor is equal to or higher than a reference pressure predetermined to be higher than atmospheric pressure; and
  instructing the transmitter to transmit a second signal indicating that the pressure in the hydrogen tank is a second sensor value detected by the second pressure sensor, if the first sensor value is lower than the reference pressure.

\* \* \* \* \*